(12) United States Patent
Woodward et al.

(10) Patent No.: US 6,169,763 B1
(45) Date of Patent: *Jan. 2, 2001

(54) CHARACTERIZING A COMMUNICATION SYSTEM USING FRAME ALIGNED TEST SIGNALS

(75) Inventors: Scott M. Woodward, Encinitas; Andrew P. DeJaco, San Diego, both of CA (US)

(73) Assignee: Qualcomm Inc., San Diego, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/808,624

(22) Filed: Feb. 28, 1997

Related U.S. Application Data

(63) Continuation-in-part of application No. 08/496,817, filed on Jun. 29, 1995.

(51) Int. Cl.[7] .................................................. H04B 17/00
(52) U.S. Cl. .......................... 375/224; 320/251; 320/247
(58) Field of Search ..................................... 375/224, 227, 375/226, 368, 358, 222; 370/282, 249, 241, 247, 252, 250; 371/20.3, 20.4, 20.5, 27.1; 455/67.1, 67.3, 67.4, 67.6

(56) References Cited

U.S. PATENT DOCUMENTS

| | | | |
|---|---|---|---|
| 3,737,766 | 6/1973 | Lubarsky, Jr. ........................ 324/57 R |
| 3,956,601 | 5/1976 | Harris et al. ................... 179/175.3 R |
| 4,443,661 | 4/1984 | Kubo ................................. 179/2 EB |
| 4,768,203 | 8/1988 | Ingle ....................................... 375/10 |
| 4,845,735 | 7/1989 | Payne et al. ............................. 379/5 |
| 4,903,323 | 2/1990 | Hendershot ............................. 455/67 |
| 4,930,118 | * 5/1990 | Sugihara ............................... 370/249 |
| 5,109,390 | * 4/1992 | Gilhousen et al. .................. 370/335 |
| 5,124,985 | * 6/1992 | Hoshikawa .......................... 455/67.4 |
| 5,301,207 | * 4/1994 | Emerson et al. ..................... 375/224 |
| 5,343,461 | 8/1994 | Barton et al. .......................... 370/13 |
| 5,404,572 | * 4/1995 | Ishii .................................... 455/67.4 |
| 5,423,091 | 6/1995 | Hanninen ............................ 455/67.3 |
| 5,424,076 | 6/1995 | Knippelmier .......................... 379/27 |
| 5,428,821 | 6/1995 | Krisna et al. ........................ 455/67.4 |
| 5,442,781 | 8/1995 | Lindstrom et al. .................... 379/27 |
| 5,471,649 | 11/1995 | Rees et al. ........................... 375/222 |
| 5,475,686 | * 12/1995 | Bach et al. ........................... 370/465 |
| 5,475,711 | 12/1995 | Betts et al. .......................... 375/222 |
| 5,515,398 | 5/1996 | Walsh et al. ......................... 375/222 |
| 5,590,410 | * 12/1996 | Deutsch et al. ...................... 375/202 |
| 5,737,317 | * 4/1998 | Takayama ............................ 370/249 |
| 5,787,114 | * 7/1998 | Ramamurthy et al. .............. 375/221 |
| 5,898,696 | * 4/1999 | Proctor et al. ....................... 370/468 |
| 5,943,361 | * 8/1999 | Gilhousen et al. .................. 375/200 |
| 6,085,336 | * 7/2000 | Swoboda et al. ...................... 714/30 |

* cited by examiner

*Primary Examiner*—Chi H. Pham
*Assistant Examiner*—Emmanuel Bayard
(74) *Attorney, Agent, or Firm*—Philip Wadsworth; Thomas R. Rouse

(57) ABSTRACT

A method and apparatus for aligning a test signal to a frame interval of a communication system in which an alignment test signal having an alternating pattern of frequencies is generated and transmitted over a communication link that carries the alignment test signal in a sequence of frames. The alignment test signal is received over the communication link as a return alignment test signal and then evaluated for frequency content. The start time of the alignment test signal is adjusted until the frequency content of the return alignment test signal corresponds to the alternating pattern of frequencies.

21 Claims, 14 Drawing Sheets

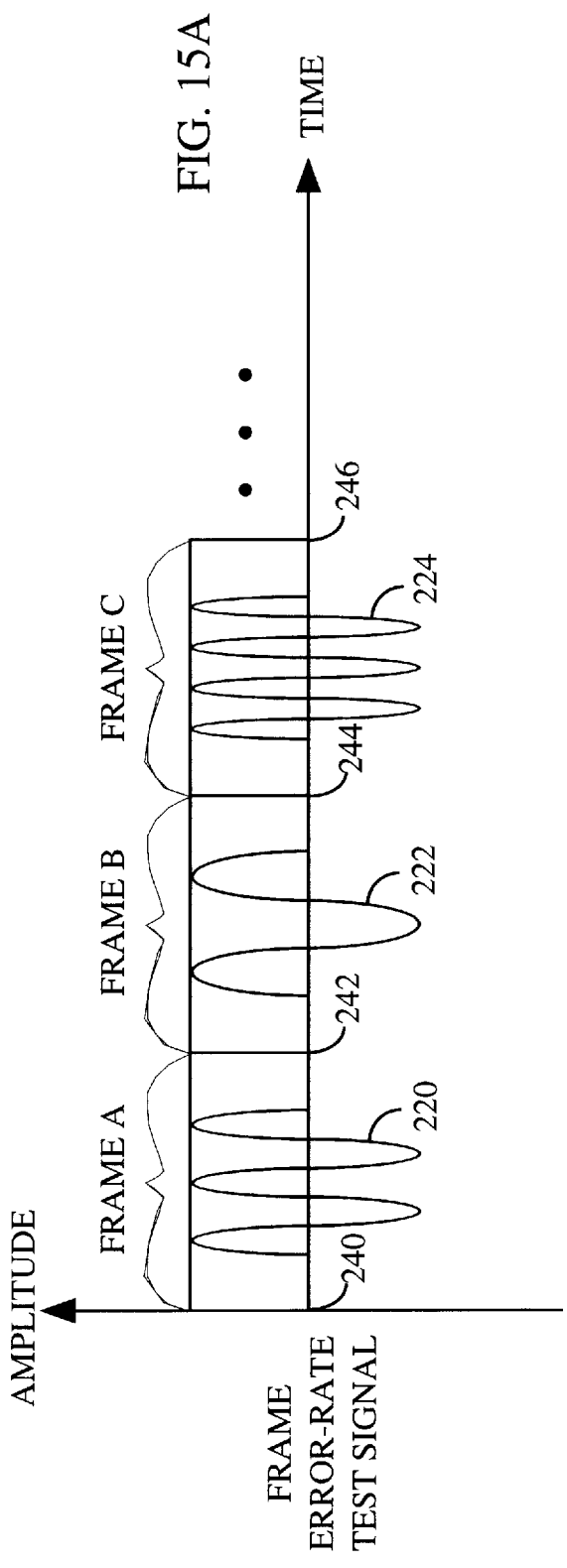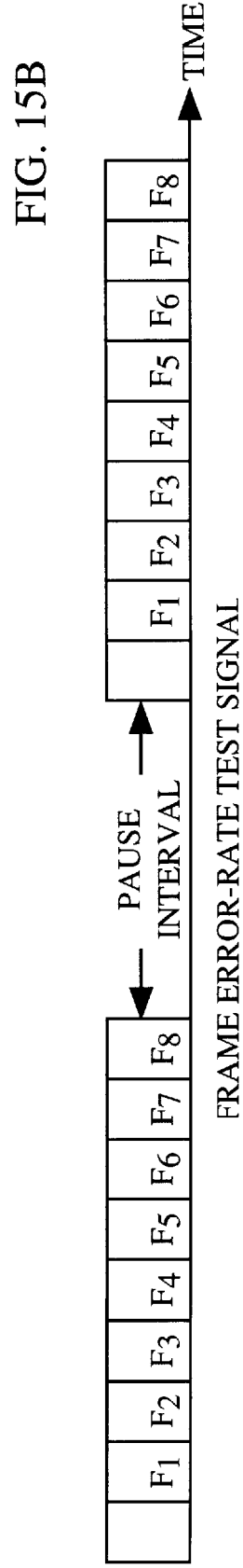

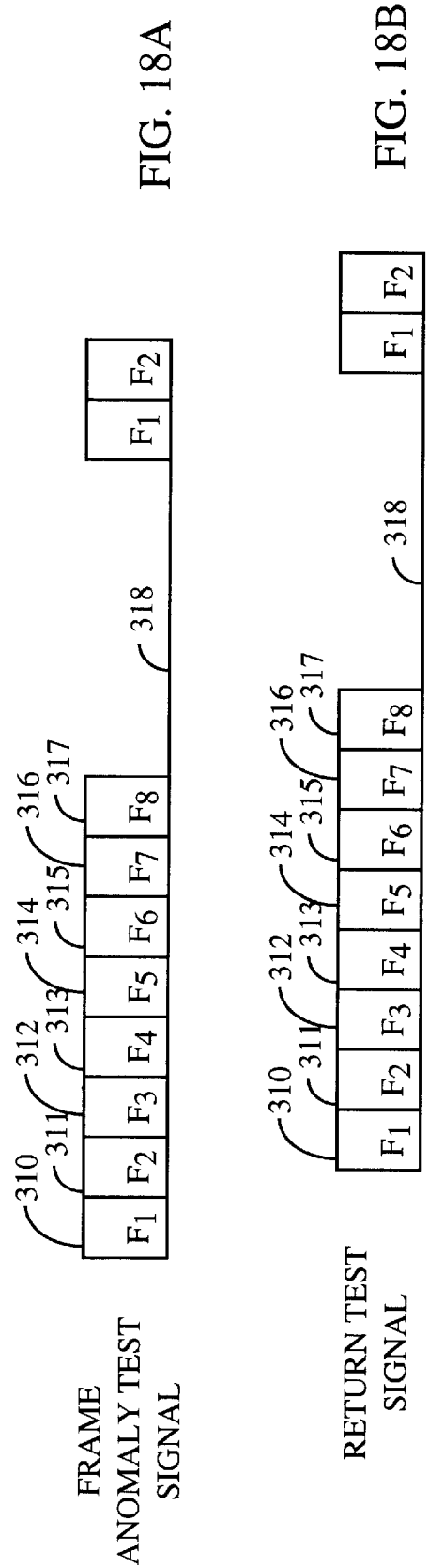

CHARACTERIZING A COMMUNICATION SYSTEM USING FRAME ALIGNED TEST SIGNALS

This application is a continuation-in-part of Ser. No. 08/496,817 filed Jun. 29, 1995.

BACKGROUND OF THE INVENTION

I. Field of Invention

The present invention relates to communication systems. More particularly, this invention relates to characterization tests of a communication system using frame-aligned test signals.

II. Art Background

Digital communication links are commonly employed to carry digital information from a source location to a physically distinct destination location. One type of digital communication link may be referred to as a frame-based communication link or a packetized communication link. Such a frame-based communication link typically carries digital data within data packets which may also be referred to as frames. Typically, each data packet is carried over the communication link during a separate time interval. Such a time interval for carrying a data packet is referred to as a frame interval.

One prior test system for performing characterization tests on a communication system that includes such a frame-based communication link is disclosed in U.S. patent application Ser. No. 08/496,817, file on Jun. 29, 1995, and entitled "Method and Apparatus for Objectively Characterizing Communications Link Quality." Such a test system injects a test signal into the communication system being characterized. The test signal is carried through the communication system including the frame-based communication link. The test system then receives back the test signal and evaluates the received test signal to provide characterization of various parameters of the communication system.

The test signals generated by such a test system usually include a series of tone bursts which are carefully selected to exercise differing parameters of the communication system. The characterization tests performed by such a test system are usually enhanced if the tone bursts of a test signal are aligned the boundaries of the frame intervals of the communication link. Such frame alignment typically prevents portions of particular tone bursts from being carried in different frame intervals. Such splitting of the test signal could cause anomalies in the received test signal.

One prior method for aligning a test signal to such frame boundaries involves a trial and error approach of injecting various types of test signals and examining the received test signal. Such an approach requires one to determine whether anomalies in a received test signal are caused by frame misalignment or by the characteristics of the communication link being evaluated. Such an approach increases the time required to evaluate a communication system and typically increases the overall cost of characterizing and maintaining the communication system.

SUMMARY OF THE INVENTION

A method and apparatus is disclosed for aligning a test signal to a frame-based communication system. An alignment test signal having an alternating pattern of frequencies is generated and transmitted over a communication link in the communication system wherein the communication link carries the alignment test signal in a series of frame intervals. The alignment test signal is received after transmission over the communication link as a received alignment test signal and then evaluated for frequency content. The start time of the alignment test signal is adjusted until the frequency content of the received alignment test signal corresponds to the alternating pattern of frequencies. The starting time of the alignment test signal indicates a frame interval boundary once adjustment of the starting time is complete.

The aligned test signal enhances a system for quantitatively evaluating the quality of communication channels within a digital communication system. In an exemplary embodiment, the present invention may be incorporated within a digital cellular communication system in which information is exchanged over spread spectrum communication channels, among a plurality of mobile users, via at least one cell-site.

The test signals may be transmitted from a land line connection through the public switched telephone network (PSTN) and through the wireless channel. The aligned test signal enhances a test that is non-intrusive on the communications link. That is to say, the tests conducted appear to all of the communications systems elements simply as another call.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 15a illustrates a frame error-rate test signal for a frame error rate test on the communication link between the base station and the subscriber terminal;

FIG. 15b is a time line that illustrates an extended duration of the frame error-rate test signal;

FIGS. 18a–18b illustrate frame anomaly detection in the communication system;

DETAILED DESCRIPTION OF THE PREFERRED EMBODIMENTS

Figure 1:
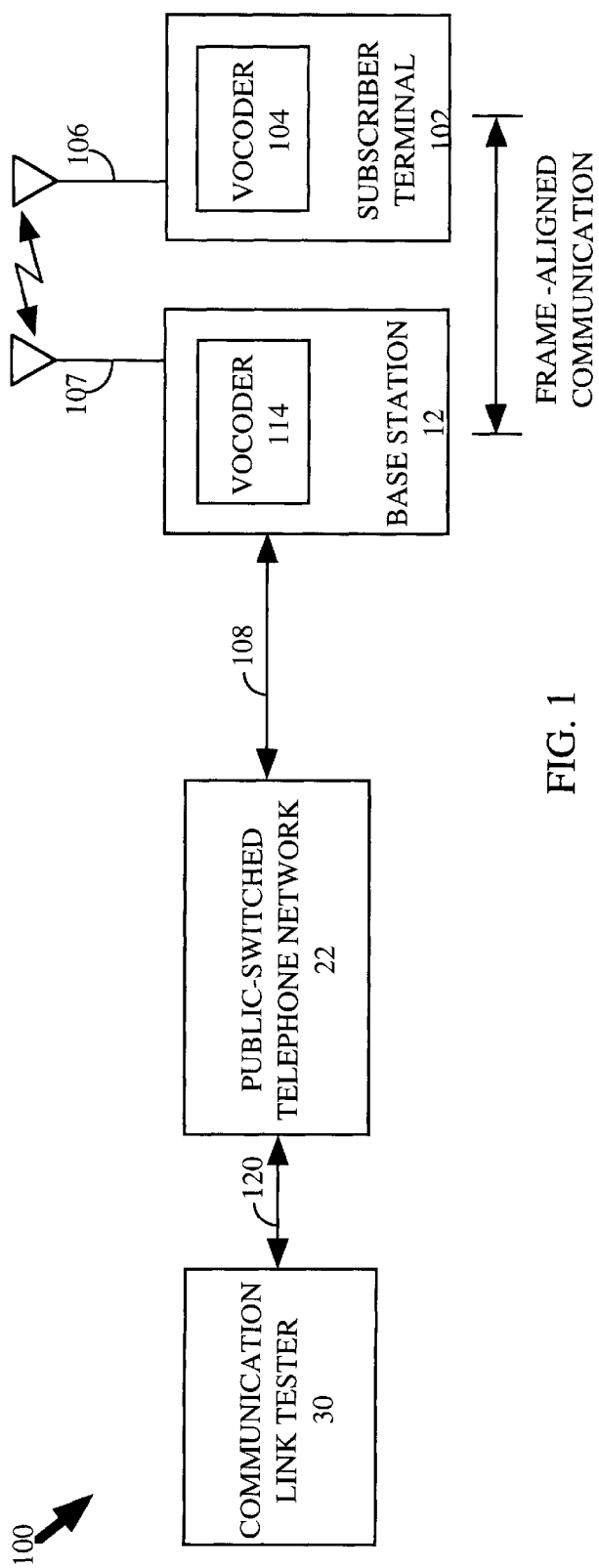
FIG. 1 illustrates a communication system including a communication link tester that performs characterization tests on the communication system.

FIG. 1 illustrates a communication system 100 including a communication link tester 30 that performs characterization functions for the communication system 100. The communication system 100 includes a base station 12 and a subscriber terminal 102. The base station 12 and the subscriber terminal 102 perform frame-based over the air communication via a pair of antennas 106 and 107. The base station 12 contains a vocoder 114 and the subscriber terminal 102 contains a vocoder 104 that implement the frame-based protocol.

In a forward direction, the vocoder 114 encodes the signal received from the communication link tester 30 and passes the encoded signal for transmission via the antenna 107. The vocoder 104 decodes the signal received via the antenna 106. In a reverse direction, the vocoder 104 encodes an internally generated signal and passes the encoded signal for transmission via the antenna 106. In turn, the vocoder 114 decodes the signal received via the antenna 107 and passes the decoded signal for transfer to the communication link tester 30.

In one embodiment, the communication link tester 30 communicates with the base station 12 through a public switched telephone network (PSTN) 22. In another embodiment, the communication link tester 30 has a direct connection to the base station 12 which bypasses the PSTN 22.

Characterization tests of the communication system 100 are performed in a return test mode and a one way test mode. In the return test mode, a test signal is generated in the communication link tester 30 (the source location) and then routed to the base station 102 (the destination location) and back to the communication link tester 30 and the received test signal at the communication link tester 30 is evaluated for frequency content. In the one way test mode, the alignment test signal is generated in the communication link tester 30 and then routed to the base station 12 and the received test signal at the base station 12 is evaluated.

Figure 2:
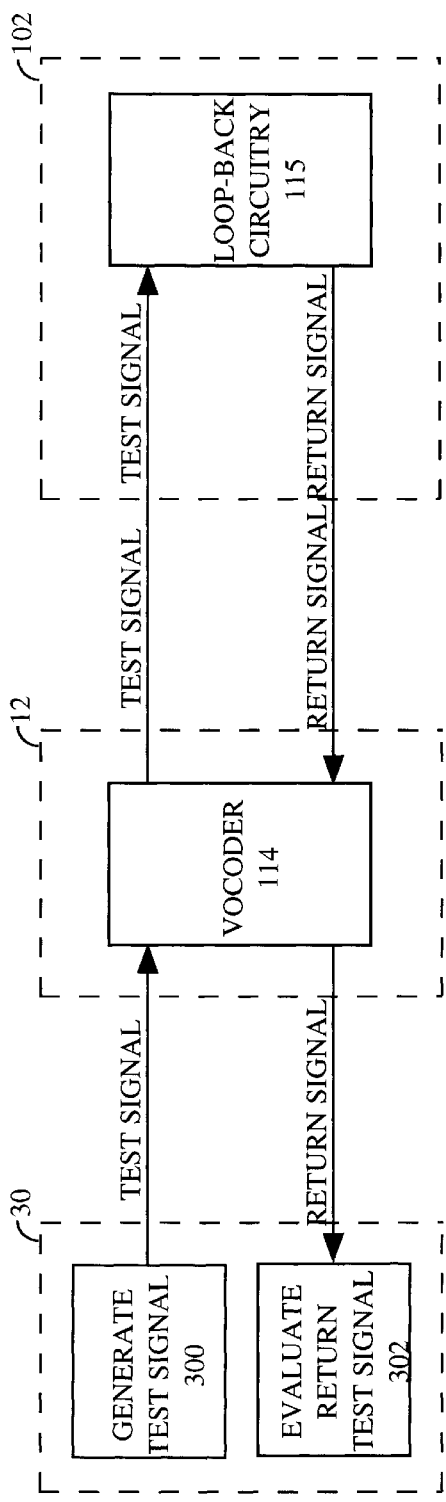
FIG. 2 illustrates one mode of characterization tests which is referred to as the return test mode.

FIG. 2 illustrates the return test mode of the characterization tests. The communication link tester 30 includes a function block 300 that generates test signals including an alignment test signal and a function block 302 that evaluates a return signal that corresponds to the test signal. The communication link tester 30 transmits the test signal in the forward direction to the base station 12. The base station 12 transmits the test signal in the forward direction to the subscriber terminal 102 after the test signal is processed by the vocoder 114. The subscriber terminal 102 receives the test signal and a loop-back circuit 115 in the subscriber terminal returns the test signal to the vocoder 104 for transmission to the base station 12 in the reverse direction as the return signal for the test signal. The base station 12 relays the return signal to the communication link tester 30 in the reverse direction. The communication link tester 30 then evaluates the return signal at the function block 302.

Figure 3:
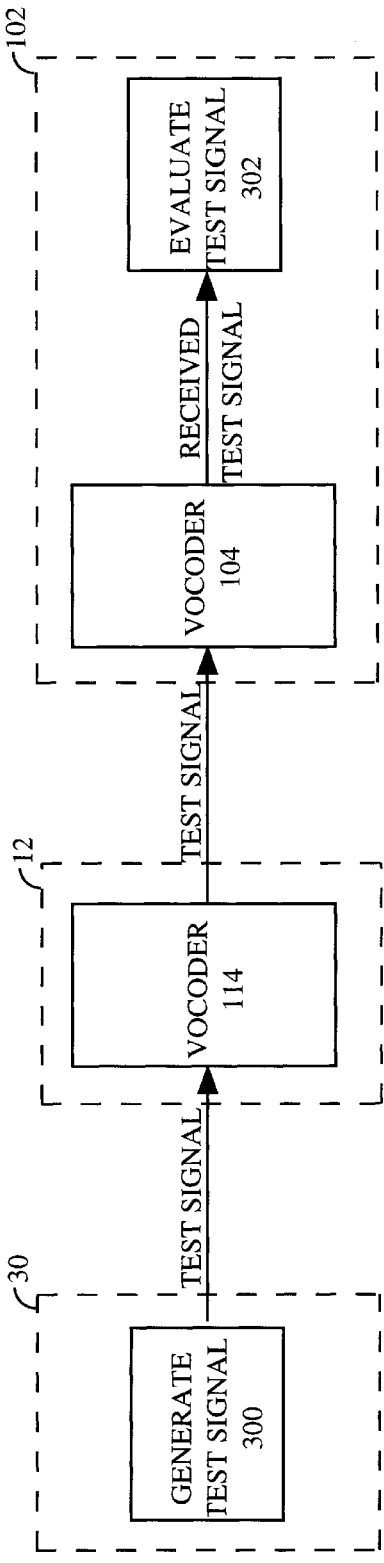
FIG. 3 illustrates another mode of characterization tests which is referred to as the one-way test mode.

FIG. 3 illustrates the one way test mode of the characterization tests. The communication link tester 30 generates a test signal at the function block 300 and transmits the test signal in the forward direction to the base station 12. The base station 12 transmits the test signal in the forward direction to the subscriber terminal 102 after the test signal is processed by the vocoder 114. The subscriber terminal 102 receives the test signal and processes the test signal with the vocoder 104. The subscriber terminal 102 in the one way test mode includes a function block 302 that evaluates the test signal as the return test signal.

Figure 4:
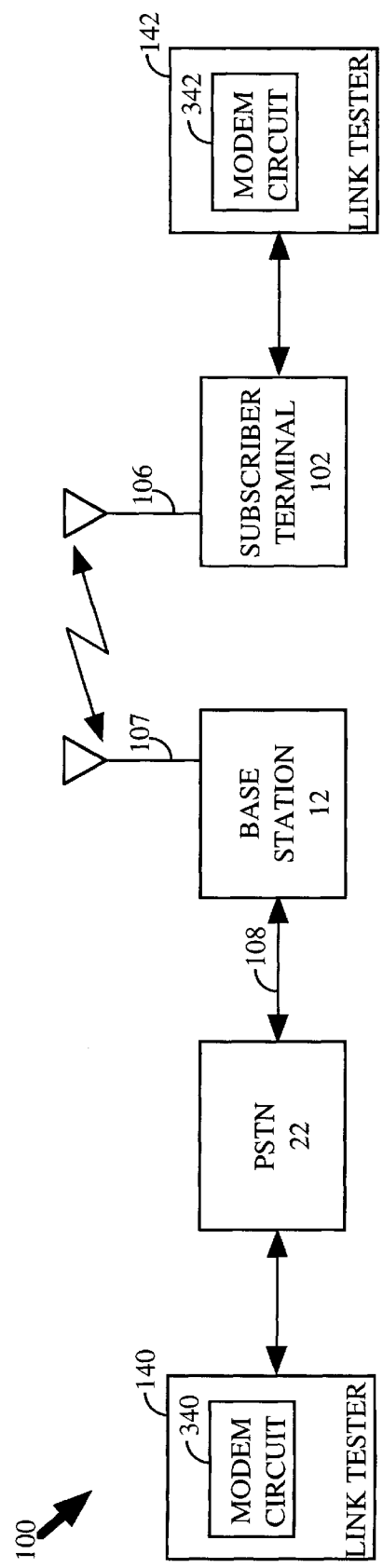
FIG. 4 illustrates two-sided test setup for performing characterization tests of the communication system.

FIG. 4 illustrates two-sided test setup for performing characterization tests of the communication system 100. The two sided tests are performed by a pair of link testers 140 and 142. Each of the link testers 140 and 142 contains a test signal generator for generating test signals including an alignment test signal and evaluation system for evaluating return test signals.

In a forward two-sided test mode, a test signal is generated by the link tester 140. The link tester 140 injects the test signal into the PSTN 22 which routes the test signal to the base station 12. The base station 12 relays the test signal to the subscriber terminal 102 and ultimately onto the link tester 142. The link tester 142 treats the received test signal as a return test signal which is evaluated for frequency content and other content as disclosed herein.

In a reverse two-sided test mode, a test signal is generated by a link tester 142 which injects the test signal into the subscriber terminal 102 which routes the test signal to the base station 12. The base station 12 relays the test signal through the PSTN 22 and ultimately onto the link tester 140. The link tester 140 handles the received test signal as a return test signal which is evaluated for frequency content and other content as disclosed herein.

In one embodiment, the link tester 142 injects the test signal into the subscriber terminal 102 and receives return test signals from the subscriber terminal 102 using an acoustic coupling from a speaker in the link tester 142 to a microphone in the subscriber terminal 102. In another embodiment, the subscriber terminal 102 is physically modified to provide an electrical signal path from the link tester 142 to an input signal path in the subscriber terminal 102.

The link testers 140 and 142 in one embodiment include a modem circuit 340 and a mode circuit 342, respectively. Each modem circuit 340–342 is a frequency shift key (FSK) modem circuit that generates tone bursts which are then frame-aligned according to techniques described herein. The FSK tone bursts provide a relatively low-bit rate data modem connection between the testers 140 and 142 which is used to exchange control and status information. The link tester 140 injects FSK tone bursts into the PSTN, which are received and demodulated by the modem circuit 342 in the link tester 142. Similarly, the link tester 142 injects FSK tone bursts into the subscriber terminal 102, which are received and demodulated by the modem circuit 340 in the link tester 140.

Figure 5:
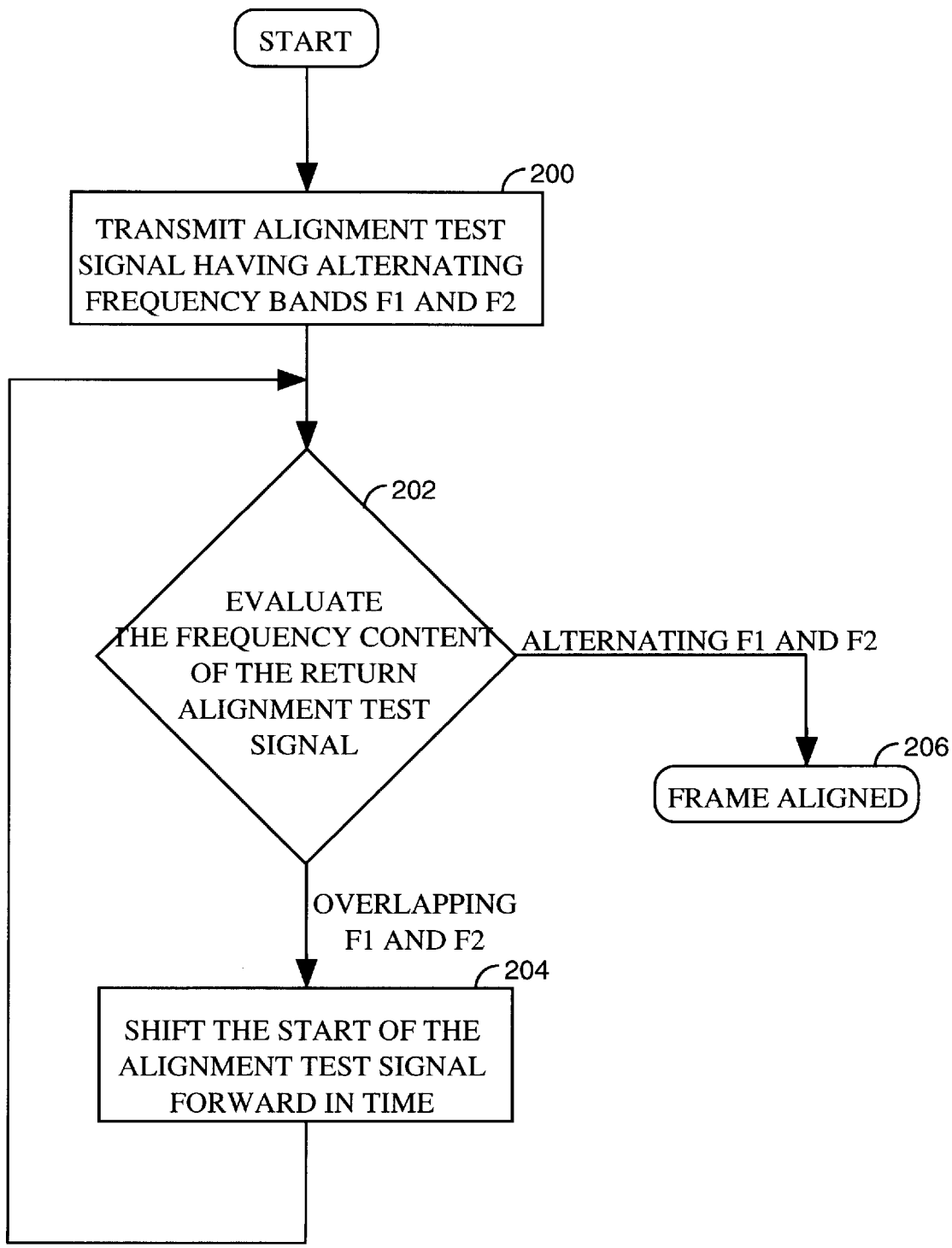
FIG. 5 illustrates a method for aligning the test signals generated by the communication link tester to the frame-based communication between the base station and the subscriber terminal.

FIG. 5 illustrates a method for aligning the test signals generated by the communication link tester 30, and the link testers 140–142 to the frame-based communication between the base station 12 and the subscriber terminal 102. At step 200, the communication link tester 30 transmits an alignment test signal to the subscriber terminal 102. The alignment signal alternates between a first frequency band (F1) and a second frequency band (F2) wherein the duration of each F1 and each F2 interval equals a duration of the frame interval for communication between the base station 12 and the subscriber terminal 102. Thereafter at step 202, a return alignment test signal is evaluated for frequency content. The return alignment test signal is either the return alignment signal received at the communication link tester 30 (FIG. 2), the alignment test signal received at the subscriber terminal 102 (FIG. 3), or the test signal received one of the link testers 140–142 (FIG. 4).

If the frequency content of the return alignment test signal indicates the alternating pattern of frequency bands F1 and F2 at block 202 then the alignment test signal is frame-aligned at block 206. When frame-aligned at block 206, the transitions between frequency bands F1 and F2 in the alignment test signal correspond to the boundaries of the frame intervals used in communication between the base station 12 and the subscriber terminal 102. If the frequency content of the return alignment test signal indicates overlapping energy in the frequency bands F1 and F2 at block 202 then the alignment test signal is adjusted at block 204.

At block 204, the communication link tester 30 shifts the alignment test signal ahead in time and continues or retransmits the alignment test signal. Thereafter at block 202, the return alignment test signal is again evaluated for frequency content that indicates frame alignment.

Figure 6A:
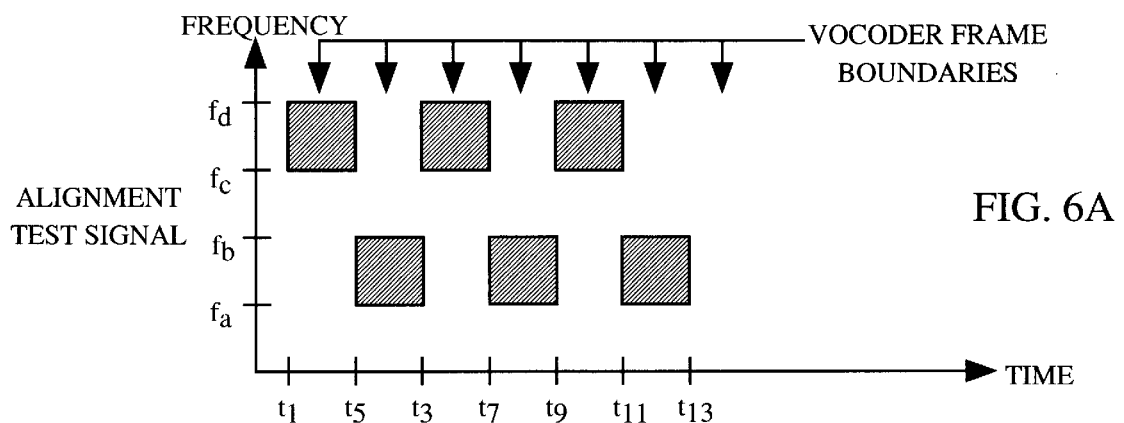
FIGS. 6a–6b illustrate the frequency content of the received alignment signal in an example wherein the alignment test signal is not aligned to the frame-based communication used in the communication channel between the base station and the subscriber terminal.
Figure 6B:
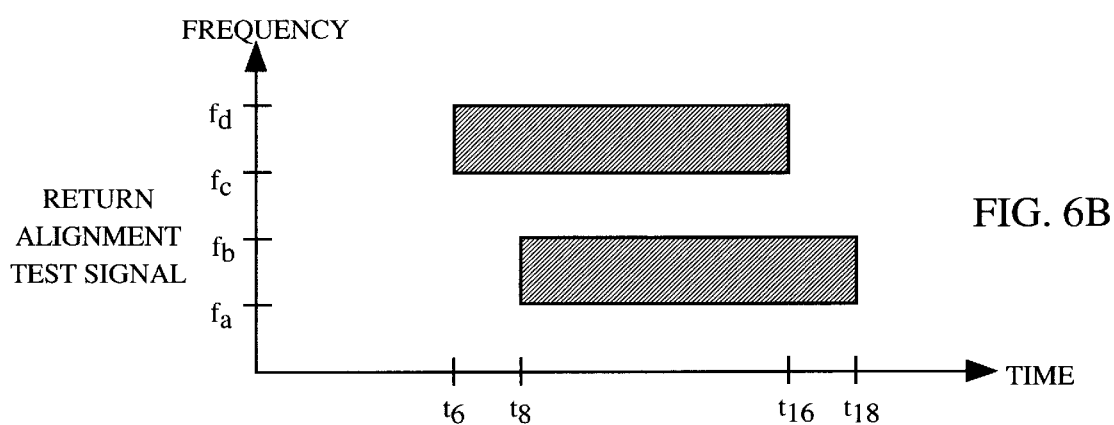

FIGS. 6a–6b illustrate the frequency content of the return alignment test signal in an example wherein the alignment test signal is not aligned to the frame-based communication used in the communication channel between the base station 12 and the subscriber terminal 102.

FIG. 6a is a graph that shows the relationship between the alignment test signal and the frame boundaries of the vocoders 114 and 104. The alignment test signal is an alternating pattern oaf frequency bands F1 and F2 starting at time $t_1$. The frequency band F1 ranges between frequencies $f_a$ and $f_b$. The frequency band F2 ranges between frequencies $f_c$ and $f_d$. As shown, the frequency bands F1 and F2 do not overlap on the frequency scale of the graph or on the time scale of the graph. This non frame aligned example of the alignment test signal contains energy in the frequency band F1 between times $t_1$ and $t_3$, followed by energy in the frequency band F2 between times $t_3$ and $t_5$, followed by energy in the frequency band F1 between times $t_5$ and $t_7$, and so on in an alternating pattern. In contrast, the vocoder frame boundaries occur at times $t_2$, $t_4$, $t_6$, $t_8$, and so on (shown implicitly).

FIG. 6b shows the return alignment test signal having energy in the frequency band F1 starting at time $t_6$ and overlapping energy in the frequency band F2 starting at time $t_8$. The time interval between times $t_1$ and $t_6$ corresponds to the round trip transmission delay between the communication link tester 30 and the subscriber terminal 102 in the return test mode. The time interval between times $t_1$ and $t_6$ corresponds to the one way transmission delay from the communication link tester 30 to the subscriber terminal 102 in the one way test mode or the two-sided test mode.

Figure 7A:
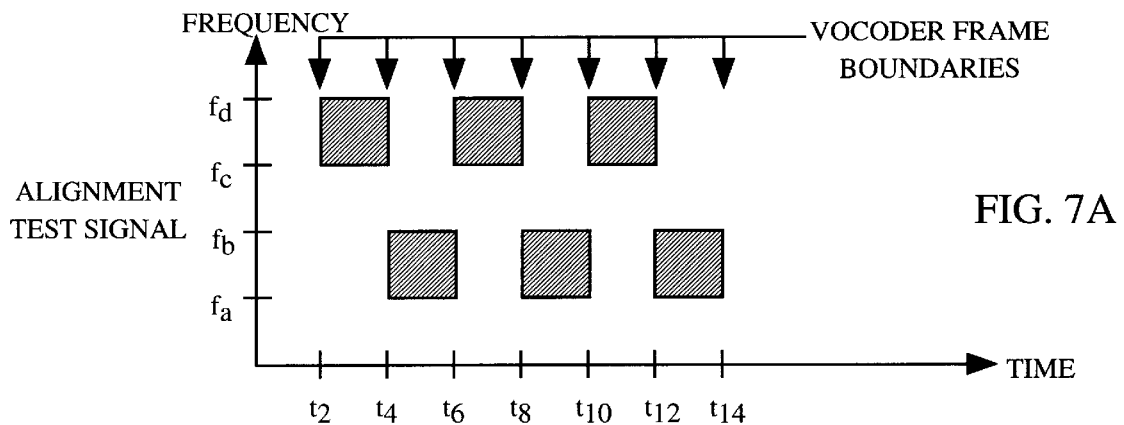
FIGS. 7a–7b illustrate the frequency content of the received alignment signal in an example wherein the alignment test signal is aligned to the frame-based communication used in the communication channel between the base station and the subscriber terminal.
Figure 7B:
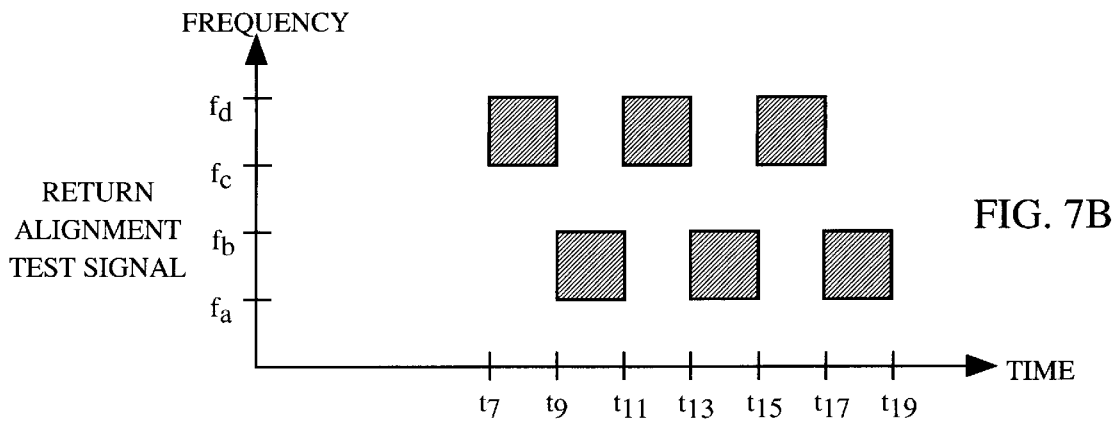

FIGS. 7a–7b illustrate the frequency content of the alignment test signal and the return alignment test signal in an example wherein the alignment test signal is substantially aligned to the frame-based communication used in the communication channel between the base station 12 and the subscriber terminal 102.

FIG. 7a shows an alternating pattern of frequency bands F1 and F2 in the alignment test signal starting at time $t_2$ which is aligned to the vocoder frame boundaries at times $t_2$, $t_4$, $t_6$, $t_8$, etc. This frame-aligned example of the alignment test signal contains energy in the frequency band F1 between times $t_2$ and $t_4$, followed by energy in the frequency band F2 between times $t_4$ and $t_6$, followed by energy in the frequency band F1 between times $t_6$ and $t_8$, and so on in an alternating and frame-aligned pattern.

FIG. 7b shows the return alignment test signal when the alignment test signal is aligned to the frame boundaries. The return alignment test signal contains energy in an alternating pattern of frequency bands F1 and F2 starting at time $t_7$. The return alignment test signal contains energy in the frequency band F1 between times $t_7$ and $t_9$, followed by energy in the frequency band F2 between times $t_9$ and $t_{11}$, followed by energy in the frequency band F1 between times $t_{11}$ and $t_{13}$, and so on. The time interval between times $t_2$ and $t_7$ corresponds to either the round trip transmission delay or the one way transmission delay depending on the test mode being conducted on the communication system 100.

Figure 8:
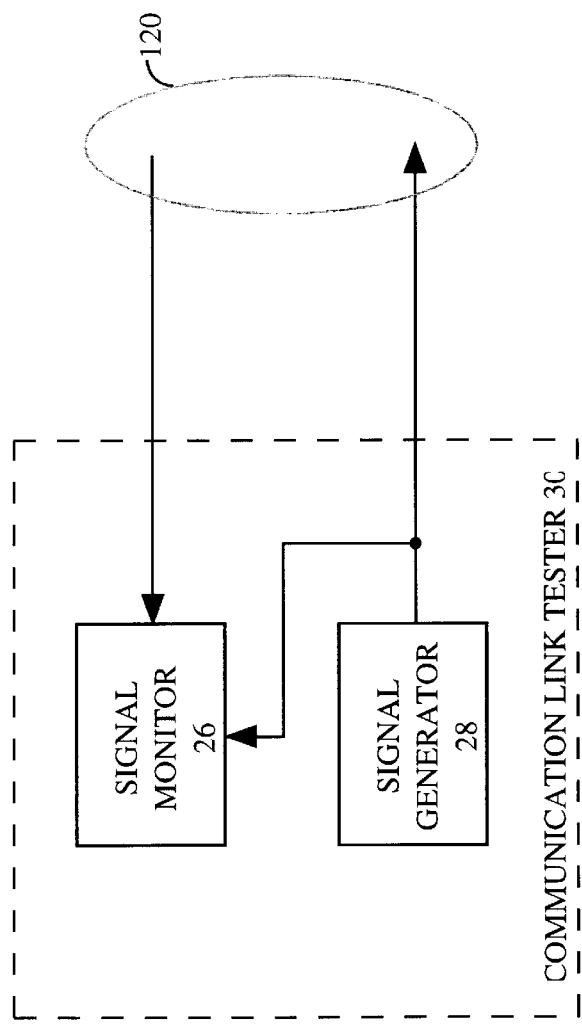
FIG. 8 illustrates the communication link tester which includes a signal generator and a signal monitor.

FIG. 8 illustrates the communication link tester 30. The communication link tester 30 includes a signal generator 28 and a signal monitor 26. The signal generator 28 generates digital signals including the alignment test signal for characterization tests on the communication system 100. The signal monitor 26 evaluates the signals returned via the communication link 120 including the received alignment signal. The link testers 140–142 each include similar signal generators and signal monitors.

In one embodiment, the communication link 120 is a TI line to the PSTN 22 and the signal generator 28 generates digital signals which are provided directly to the TI line. The signal monitor 26 in such an embodiment receives the returned signal in digital form by means of the Tl line.

In an alternative embodiment, the digital signals from signal generator 28 are converted to analog signals by means of a digital to analog converter (not shown) and sent to the PSTN 22 over an analog line. In this alternative embodiment, an analog returned signal is converted to a digital signal by means of an analog to digital converter (not shown) and then provided to signal monitor 26.

In one embodiment, the signal monitor 26 and the signal generator 28 are implemented in a microprocessor or microcontroller wherein all measurements and generated signals are digital. In another embodiment, the signals are generated by analog signal generators and monitored by analog signal measurement apparatus.

Figure 9:
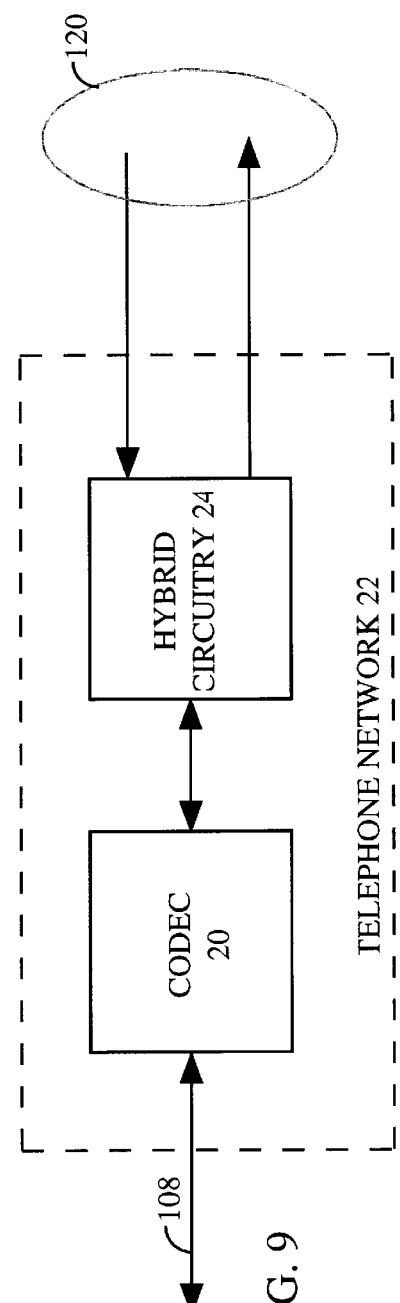
FIG. 9 illustrates the PSTN which includes a set of hybrid circuitry and a codec.

FIG. 9 illustrates the PSTN 22 which includes a set of hybrid circuitry 24 and a codec 20. The test signals including the alignment test signal from signal generator 28 is provided to the hybrid circuitry 24 via the communication link 120. The hybrid circuitry 24 converts a two line signal to a four line signal. The hybrid circuitry 24 in typical telephone systems is located in the central office of the telephone system.

The signal from the hybrid circuitry 24 is provided to the codec 20. The codec 20 converts an analog signal from the hybrid circuitry 24 to a linear digital signal. The linear digital signal is then converted to a -law signal. The pulse code modulated (PCM) signal from codec 20 is then provided by the PSTN 22 to the base station 12 via a communication link 108.

Figure 10:
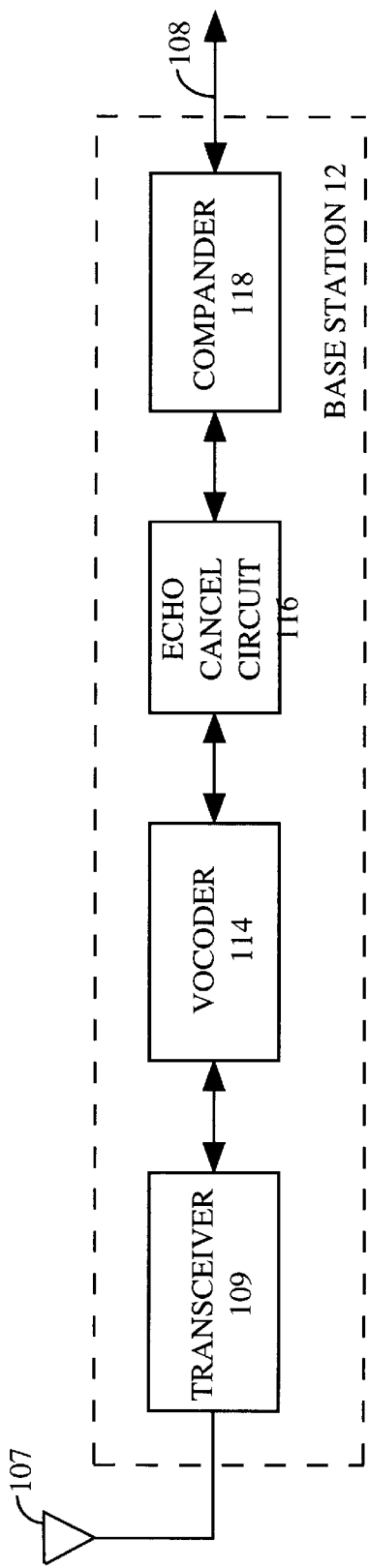
FIG. 10 illustrates the base station which includes a transceiver, a vocoder, an echo cancel circuit, and a compander.

FIG. 10 illustrates the base station 12 which includes a transceiver 109, the vocoder 114, an echo cancel circuit 116, and a compander 118. The compander 118 converts the companded signal from the communication link 108 to a linear representation which is then provided to the echo cancel circuit 116. The echo cancel circuit 116 enhances the perceptual sound quality of transmitted signals by canceling the echo in the transmitted signal. In one embodiment, echo cancel circuit 116 is a network echo canceler as described in U.S. Pat. No. 5,307,405. The signal from the echo cancel circuit 116 is provided to the vocoder 114.

The vocoder 114 encodes the signal and packs the signal into a series of frames. In one embodiment, the vocoder 114 is a variable rate code excited linear prediction (CELP) coder, an example of which is detailed in U.S. Pat. No. 5,414,796 assigned to the assignee of the present invention and incorporated herein by reference. The encoded signal is then provided to the transceiver 109.

The transceiver 109 encodes the signal for error correction and detection purposes, modulates and up converts the signal and provides the signal to the antenna 7 for broadcast. In one embodiment, transceiver 109 is a code division multiple access (CDMA) transceiver, an example of which is described in U.S. Pat. Nos. 4,901,301 and 5,103,459 assigned to the assignee of the present invention and incorporated herein by reference.

Figure 11:
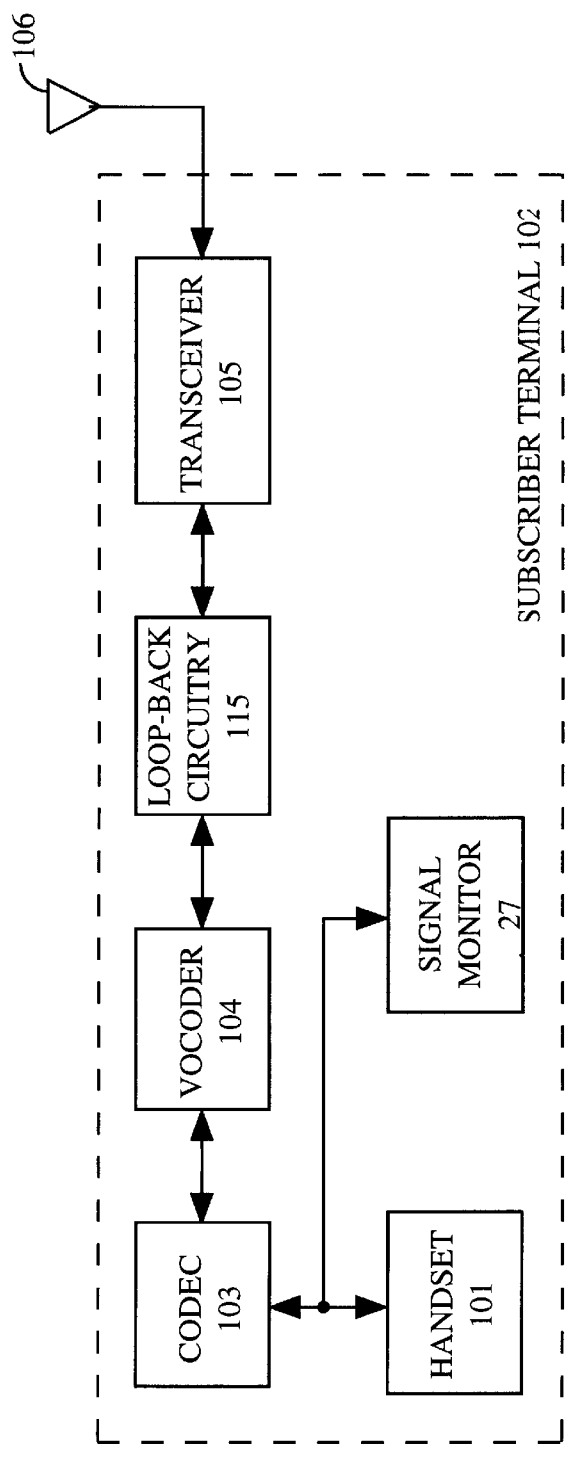
FIG. 11 illustrates the subscriber terminal which includes a handset, a codec, a vocoder, a set of loop-back circuitry, and a transceiver.

FIG. 11 illustrates the subscriber terminal 102 which includes a handset 101, a codec 103, the vocoder 104, a set of loop-back circuitry 115, and a transceiver 105. The broadcast signal from the base station 12 is received at the antenna 106 and provided to the transceiver 105. The transceiver 105 down converts and de-modulates the signal and performs error correction and detection operations upon the signal. In one embodiment, the transceiver 105 is a code division multiple access (CDMA) transceiver, an example of which is described in U.S. Pat. Nos. 4,901,301 and 5,103, 459 assigned to the assignee of the present invention and incorporated herein by reference.

In the forward direction in the one-way and two-sided test modes, the signal from the transceiver 105 is passed through the loop-back circuitry 115 to the vocoder 104 where the signal is decoded then provided to the codec 103. The codec 103 converts the signal to an analog signal for the handset 101.

In the reverse direction in the one-way and two-sided test modes, the handset 101 converts acoustic signals to electric signals which are in turn provided to the codec 103. The codec 103 converts the analog electric signals to digital signals which are encoded by the vocoder 104. The vocoder 104 then provides the encoded signal through the loop-back circuitry 115 to the transceiver 105 to the antenna 106.

In the return test mode, the test signal including the alignment test signal received by the transceiver 105 is provided to the loop-back circuitry 115 which provides the signal directly back to the transceiver 105 for broadcast as a return signal such as the return alignment signal via the antenna 106. The return test mode in one embodiment is activated by a user of the subscriber terminal 102 by means of a switch (not shown). The return test mode in another embodiment is activated remotely by sending a predetermined data sequence from the communication link tester 30. In one embodiment, the loop-back circuitry 115 includes a microprocessor or micro-controller.

In the reverse direction, the broadcast return signal received at the antenna 107 of the base station 12 is provided to the transceiver 109. The transceiver 109 down converts, demodulates and performs error correction and detection on the return signal. The signal is then provided to the vocoder 114 which decodes the return signal and provides the decoded returned signal to the echo cancel circuit 116. The echo canceled return signal is then provided to the compander 18 where the -law return signal is converted and transmitted as a pulse code modulated (PCM) return signal back to the PSTN 22. At the codec 20, the -law return signal is converted to an analog return signal which is provided to the hybrid circuitry 24. This returned analog signal is then provided through the hybrid circuitry 24 to the signal monitor 26 of the communication link tester 30. At the signal monitor 26, the return signal is analyzed to characterize the objective quality of the communication system 100 and to align test signals generated by the communication link tester 30 to the frame boundaries of the vocoders 104 and 114.

In the one way test mode, the received test signal at the subscriber terminal 102 passes through the loop-back circuitry 115 and ultimately to the signal monitor 27. The received test signal is analyzed by the signal monitor 27 to characterize the objective quality of the communication system 100 and to align test signals generated by the communication link tester 30 to the frame boundaries of the vocoders 104 and 114.

Figure 12A:
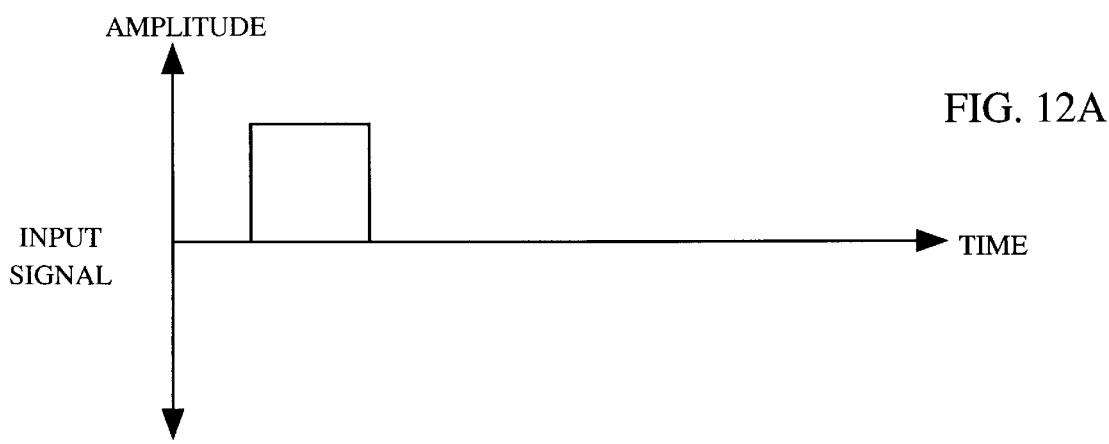
FIGS. 12a–12c illustrate a characterization of the round trip delay of a test signal in the communication system.
Figure 12B:
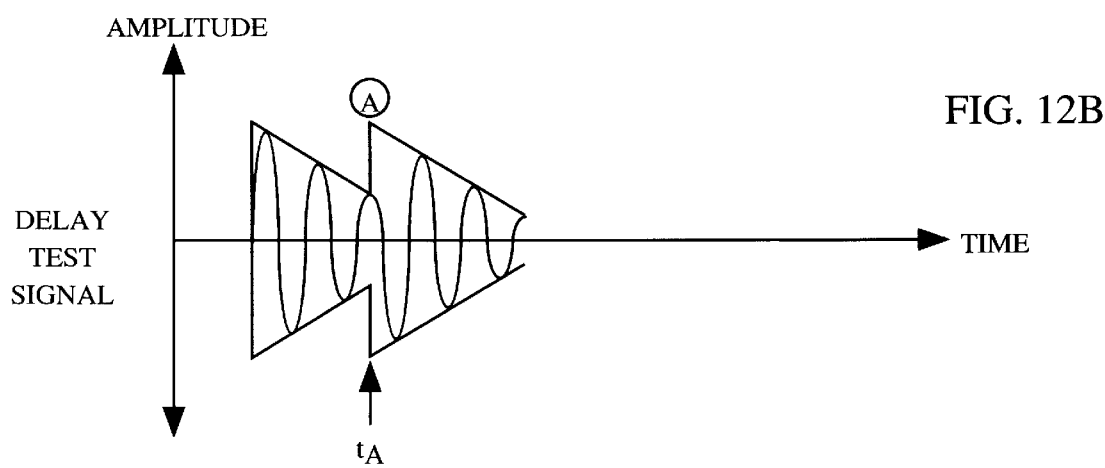
Figure 12C:
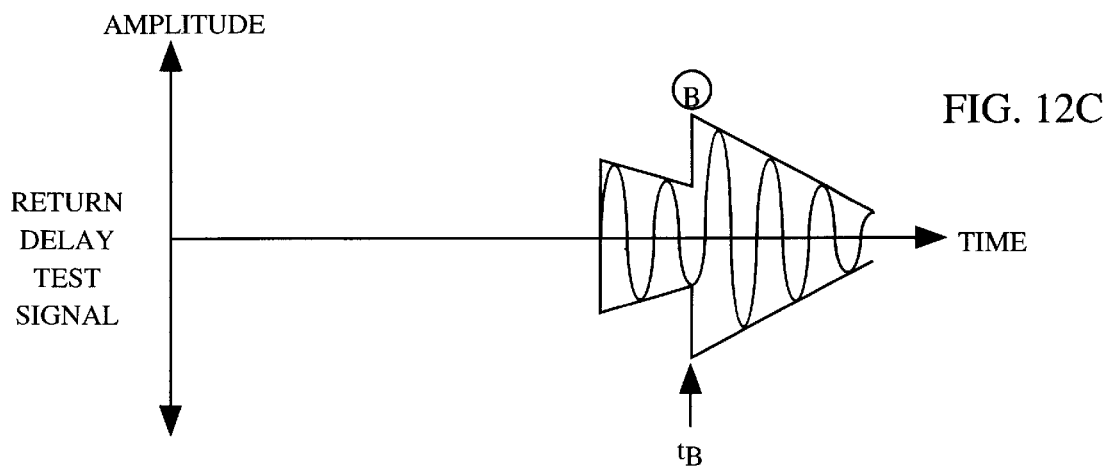

FIGS. 12a–12c illustrate a characterization of the round trip delay in the communication system 100. FIG. 12a illustrates an input signal in the form of a square pulse that is bandpass filtered to provide a delay test signal for the delay measurement. In one embodiment, the square pulse input signal is 16 milliseconds long and is filtered by a bandpass filter with a low frequency cutoff of 1000 Hz and a high frequency cutoff of 3000 Hz. FIG. 12b illustrates the delay test signal generated by the signal generator 28. The delay test signal shown is digitally generated by the signal generator 28 and transmitted to the subscriber terminal 102 in the return test mode. FIG. 12c illustrates a return delay test signal received by the communication link tester 30 from the subscriber terminal 102 in response to the delay test signal.

In one embodiment, the delay test signal is generated by a microprocessor programmed to generate such a signal, as is well known in the art. The signal generator 28 provides the appropriate digital samples to PSTN 22. The input square wave is bandpass filtered because the PSTN 22 contains circuitry that bandpass filters signals. If the input signal is not prefiltered before being provided to the PSTN 22 then the correlation of the delay test signal and the corresponding return signal in the signal monitor 26 may suffer in precision.

In one embodiment, the delay time ($t_d$) is measured as the time between the time of transmission of the second peak (Point A of FIG. 12b) in the delay test signal, which results from the filtering of the falling edge of the square pulse of FIG. 12a and the time of reception of the second peak of the return delay test signal (Point B of FIG. 12c). The delay time ($t_d$) is defined by the following equation:

$$t_d = t_B - t_A, \qquad (1)$$

where $t_B$ is the time of arrival of the second peak of the return delay test signal and $t_A$ is the time of transmission of the second peak of the delay test signal. The reason for the measurements being based upon the second peaks is that an automatic gain control (AGC) (not shown) in the vocoder 114 takes time to adapt to the change of signal strength in the leading edge of the pulse thus the second peak is stronger and more easily distinguished and correlated.

Figure 13:
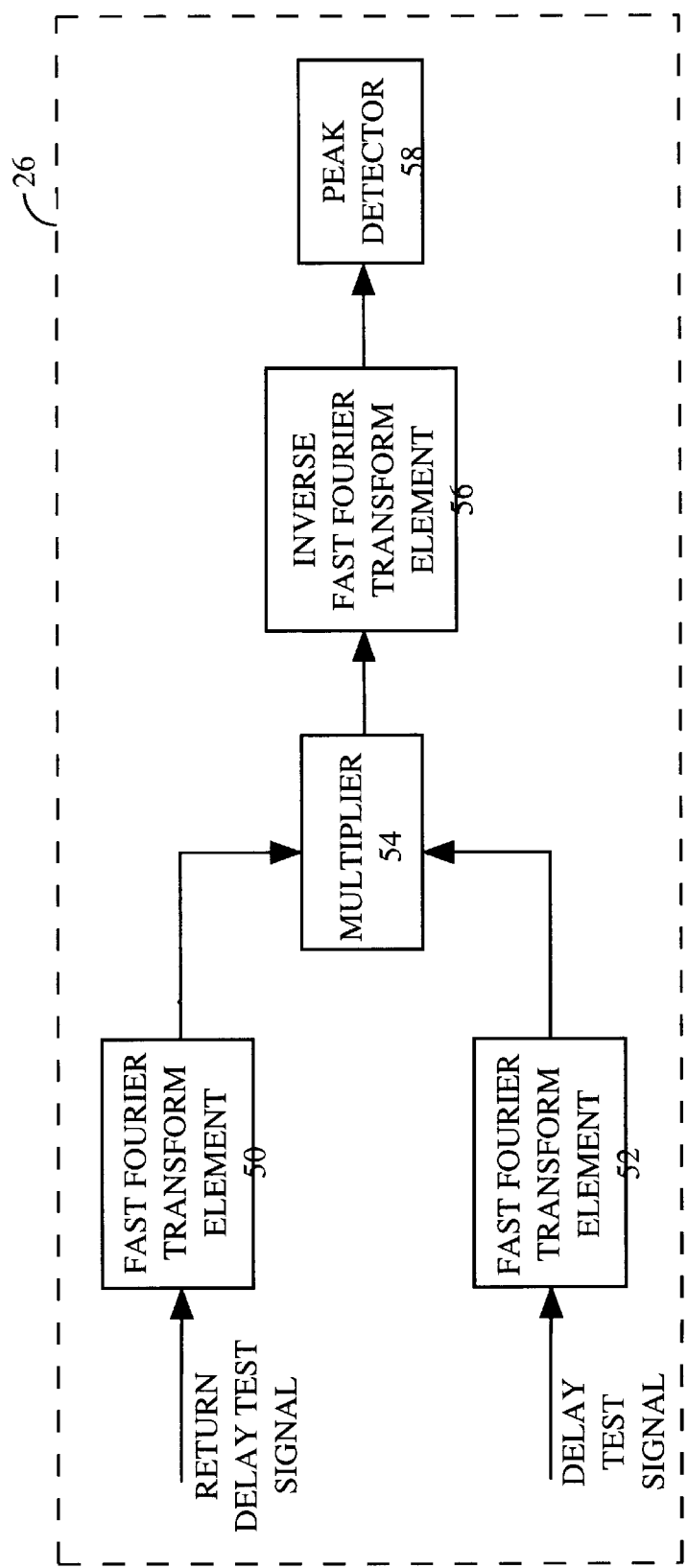
FIG. 13 illustrates an apparatus in the signal monitor for analyzing the time delay in the communication system.

FIG. 13 illustrates an apparatus in the signal monitor 26 for analyzing the time delay in the communication system 100. The delay test signal provided by the signal generator 28 is provided to a fast Fourier transform (FFT) element 52 which computes the Fourier transform of the delay test signal. The return delay test signal is provided to an FFT element 50. The Fourier transform of the delay test signal and the Fourier transform of the return delay test signal are provided to a multiplier 54. The two signals are multiplied and their product is provided to an inverse fast Fourier transform (IFFT) element 56. The IFFT element 56 takes the inverse Fourier transform of the signal out of the multiplier 54 and provides that signal to a peak detector 58. The peak detector 58 analyzes the signal provided by the IFFT element 56 and identifies a peak in the signal.

The peak identified by the peak detector 58 identifies the round trip delay of the delay test signal which is the convolution of the delay test signal and the return delay test signal. In one embodiment, the FFT elements 50 and 52 take 4096 point fast Fourier transforms of the respective signals. The number of points selected for the FFT operation must be sufficient to cover all possible delays. For example, in a communication system wherein the typical round trip delay is approximately 200 milliseconds, the 4096 covering 512 milliseconds at a 8 KHz sampling rate is more than sufficient. In an alternative embodiment, the delay test and return delay test signals can be convolved directly or a matched filter may be used to compute the correlation of the two signals.

Depending on how accurate one needs the measurement to be, the test may be repeated several times. In one embodiment, the square pulse is provided at different positions within the transmitted data frame. There are two reasons which make repeating the measurement desirable. First, noise in the communication system 100 can cause glitches in the output signal which can cause errors in measurement. The second reason to repeat the test is because of the possibility of frame erasures. In one embodiment, 20 millisecond frames of 160 samples each are transmitted through the system. In that embodiment, the delay test is repeated 16 times, once every 10 symbols.

Figure 14A:
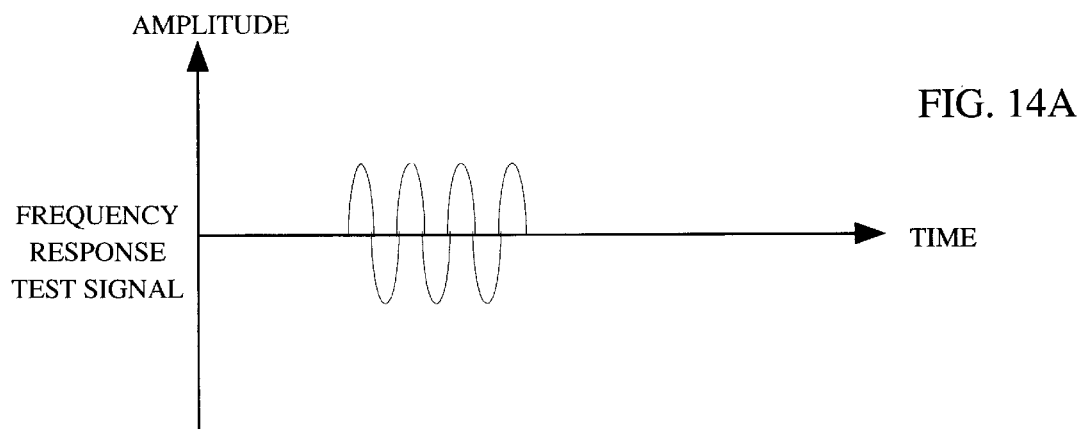
FIGS. 14a–14c illustrate a frequency response test for the communication system.
Figure 14B:
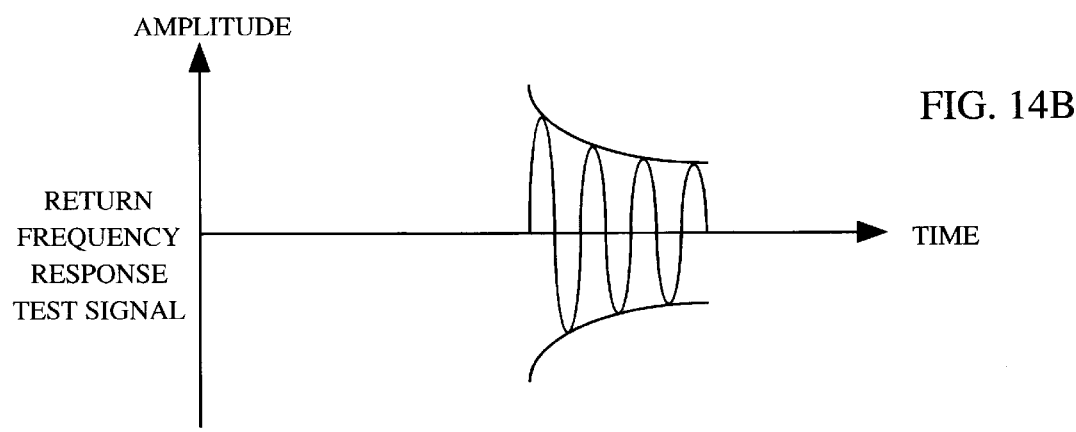
Figure 14C:
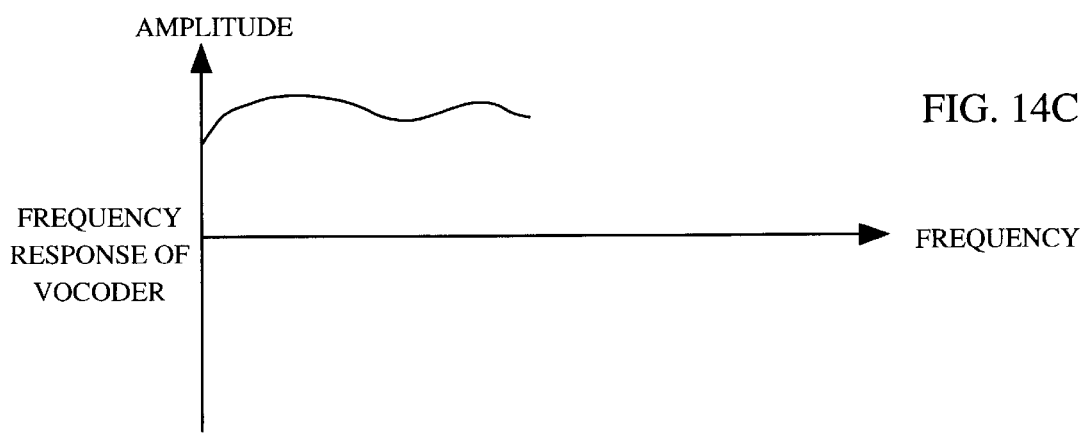

FIGS. 14a–14c illustrate a frequency response test for the communication system 100. FIG. 14a illustrates frequency response test signal generated by the signal generator 28 for the frequency response measurement. In the return test mode, the frequency response test signal is transmitted to the subscriber terminal 102 and returned and analyzed by the communication link tester 30. In the one way test mode, the frequency response test signal is transmitted to the subscriber terminal 102 and is then analyzed within the subscriber terminal 102. In the two-sided test mode, the frequency response test signal is transmitted by one of the link testers 140–142 and then received and analyzed by the other link tester 140–142.

In one embodiment, the frequency response test signal is a sine wave or tone of a fixed duration which is generated by a microprocessor programmed to generate the tones for the frequency response test. The microprocessor may be programmed to generate the tones or may simply retrieve samples of the frequency response test signal from memory within the microprocessor.

The maximum duration of the tone ($t_{max}$) is given by the following equation:

$$t_{max} = t_d - t_{NE}, \quad (2)$$

where $t_d$ is the round trip delay described earlier and $t_{NE}$ is the near end delay which is the round trip time of a signal from the signal generator 28 reflected by the hybrid circuit 24 back to the signal monitor 26. In one embodiment, the frequency response test signal is a sine wave of 100 milliseconds in duration.

FIG. 14b illustrates a return frequency response test signal which is returned to the communication link tester 30 in the return test mode or is received by the subscriber terminal 102 in the one way test mode or the link tester 140 or the link tester 142 in the two-sided test mode. As shown, the vocoder 114 introduces distortion into the received frequency response test signal.

FIG. 14c illustrates the frequency response of the vocoder 114 independent from any other effects of the communications link. In one embodiment, the distortion introduced by the vocoder 114 is removed from the received frequency response signal in the evaluation of the frequency response. The resulting frequency response of the link characterized at the frequency of the frequency response test signal is the ratio between the energy of received frequency response test signal with the frequency response of the vocoder 114 removed and the energy of the frequency response test signal provided by the signal generator 28.

In one embodiment, the frequency response test is performed in increments of 100 Hz in the range from 100 Hz to 3900 Hz. The frequency response test is repeated at each test frequency because of the possibility of frame erasures.

Another test performed by the communication link tester 30 on the communication system 100 is a noise energy test. In noisy energy test, no signal is sent by the signal generator 28 and the signal monitor 26 measures the energy of the return signal. In one embodiment, the signal monitor 26 simply examines the values of the digital data in the frames of the return signal. In an alternative embodiment, the return signal is an analog signal and the communication link tester 30 includes an analog to digital converter. In another alternative embodiment, the signal monitor 26 is an analog sound energy measurement device, the design and implementation of which are well known in the art.

The communication link tester 30 performs a frame error rate test on the communication link between the base station 12 and the subscriber 102 by generating a frame error rate test signal having in a predetermined pattern of frequencies. When a frame erasure occurs during the test, the vocoder 114 re-transmits the last previous good frame. The frame error rate test signal is received back at the communication link tester 30 in the return test mode or is received by the subscriber terminal 102 in the one way test mode. The predetermined pattern in the return frame error rate test signal is analyzed to determine whether the pattern is the same pattern as was generated by the signal generator 28. The number of mismatches in the pattern equals the number of frame erasures on the combined forward and reverse links in the return test mode or on the forward link in the one way test mode or the forward or reverse link in the two-sided test mode.

FIG. 15a illustrates a frame error-rate test signal having a series of tones 220–224 ($F_1$–$F_3$) each centered in one of a series of frame intervals A–C of the communication link between the base station 12 and the subscriber terminal 102. A series of frame boundaries 240–246 of the frame intervals A–C are determined according to the techniques disclosed above. In one embodiment, the frame intervals A–C are each 20 milliseconds in duration and the tones $F_1$–$F_3$ are each 10 milliseconds in duration.

In one embodiment, the signal monitors 26 and 27 are implemented in a microprocessor programmed to determine whether the return frames are indicative of frame erasures by examining the pattern of the tones in the return frames. The signal monitors 26 and 27 maintain a running record of the frame error rate statistics. Data base methods for maintaining such statistics are well known in the art.

FIG. 15b is a time line that illustrates an extended duration of the frame error-rate test signal which includes a series of tones $F_1$–$F_8$ followed by a pause interval followed by a series of tones $F_1$–$F_8$. The series of tones $F_1$–$F_8$ must not have a duration ($t_{max}$) greater than the round trip delay $t_d$ less the near end delay (equation 2) to prevent the effects of double talk at the echo cancel circuit 116 and the near end echo from the hybrid circuit 24 from interfering with the test. The pause interval between the two series of tones must be greater than the duration of the tones plus the near end delay or the round trip delay whichever is the greater. The tones $F_1$–$F_8$ are provided directly from the signal generator 28 to the signal monitor 26 or 27 as appropriate along with the return signal for comparison.

In another embodiment in the return test mode, the loop-back circuitry 115 provides a predetermined tone upon reception of a frame erasure. This predetermined tone is transmitted back to the signal monitor 26. The predetermined tone from the loop-back circuitry enables the signal monitor 26 could distinguish between those errors that occur on the forward link (signals transmitted from the base station 12 to the subscriber terminal 102) and those frame erasure that occur on the reverse link (signals transmitted from the subscriber terminal 102 to the base station 12).

Figure 16A:
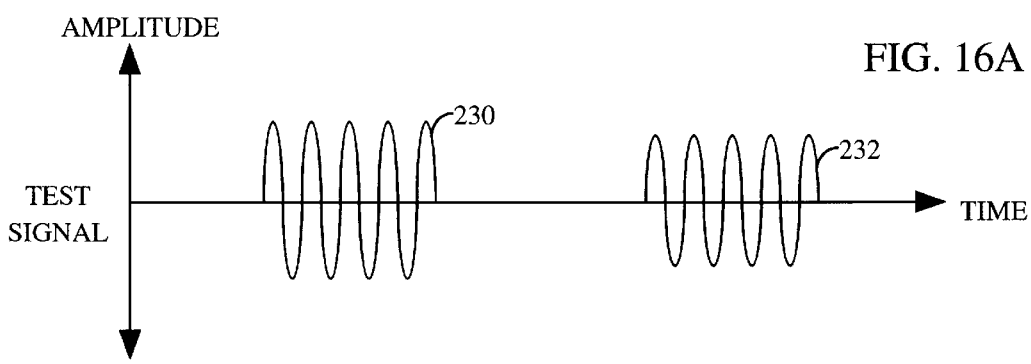
FIGS. 16a–16d illustrate the measurement and characterization of sample slips and repetitions that result of lack of synchronization between the PSTN and the base station.
Figure 16B:
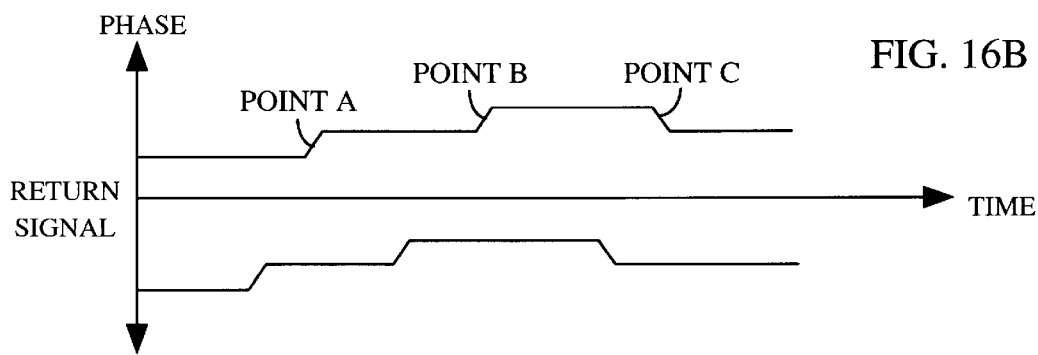

FIGS. 16a–16d illustrates the measurement and characterization of samples slips and repetitions that result of lack of synchronization between the PSTN 22 and the base station 12. FIG. 16a illustrates a test signal generated by the signal generator 28 to characterize the sample slipping and repetitions. The test signal includes a pair of tones 230 and 232. As described previously, the duration of each tone 230 and 232 must not exceed the round trip delay $t_d$ less the near end echo delay to prevent the effects of double talk at the echo cancel circuit 16 and the near end echo from the hybrid circuitry 24. It should be noted that it is also possible to provide an echo canceler in front of the signal monitor 26 so that the near end echo is no longer of concern. In one embodiment, the duration of each tone 230 and 232 is 160 milliseconds.

The signal monitor 26 includes phase detection circuitry for monitoring the phase of the return signal that results from the test signal for the sample slipping and repetitions test. In one embodiment, the phase detection circuitry in the signal monitor 26 is implemented in a microprocessor and performs the analysis of the phase changes by means of digital algorithms that are well known in the art. Shifts in phase indicate sample slips or repetitions. An increase of the phase of the return signal indicates a sample slip as indicated by points A and B of FIG. 16b. When the phase decreases as designated by point C, this indicates a sample repetition.

Figure 16C:
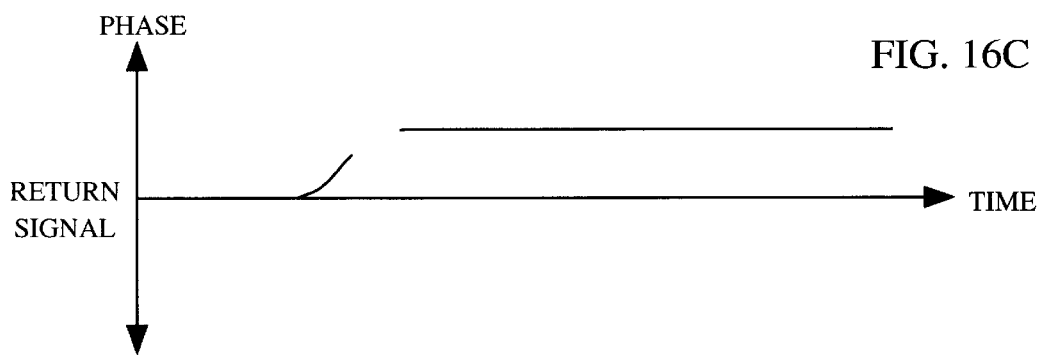
Figure 16D:
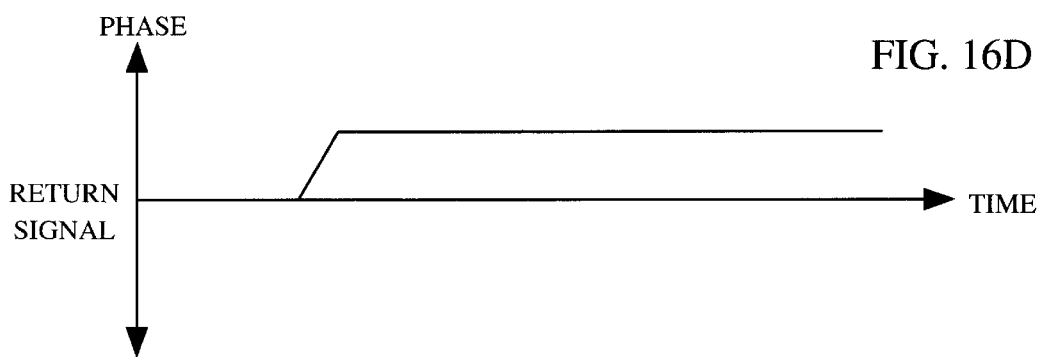

The tests disclosed herein can distinguish between those slips that occur on the forward link from those that occur on the reverse link. Forward link slips or repetitions have a more gradual increase in the phase change whereas reverse link slips and repetitions are more abrupt. FIG. 16c provides a example of the type of phase change one would expect of a forward link slip whereas FIG. 16d illustrates the type of phase change that one would expect to see resulting from a reverse link slip or repetition. Thus, the present invention can distinguished between sample slips and repetitions and those that occur on the forward link from those that occur on the reverse link.

Figure 17A:
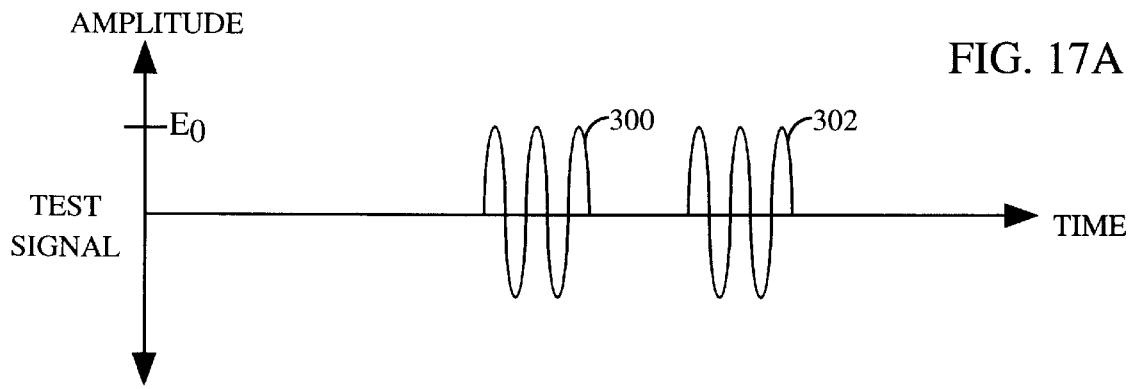
FIGS. 17a–17c illustrate a technique for determining the data rate of the vocoder in the base station.
Figure 17B:
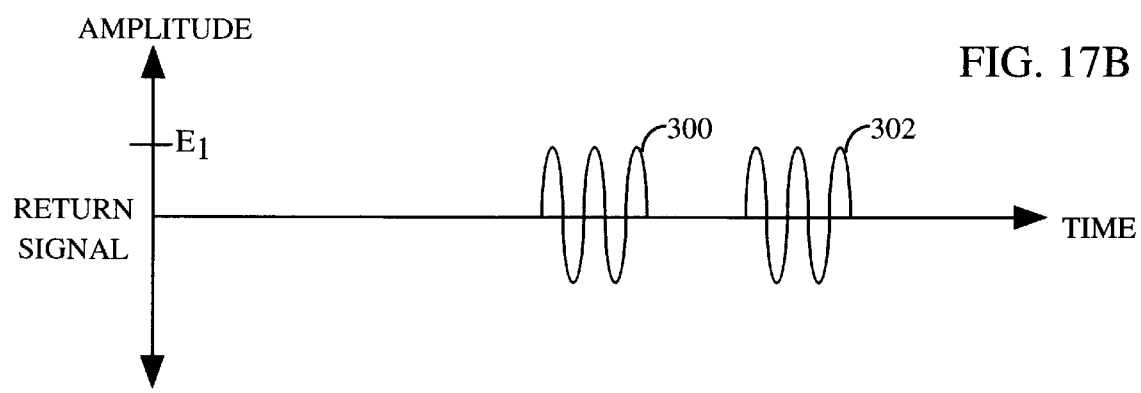
Figure 17C:
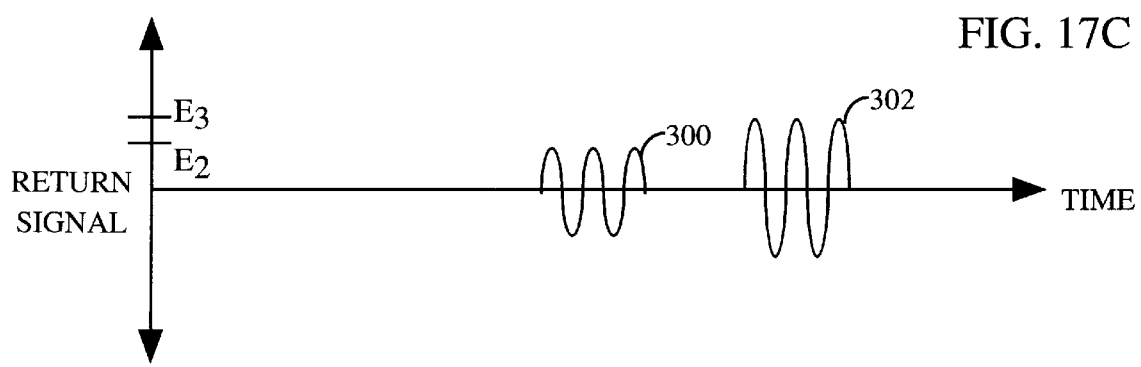

FIGS. 17a–17c illustrate a technique for determining the data rate being used by the vocoders 104 and 114. In one embodiment, the vocoders 104 and 114 have an output data rate of either 8 kilobits per second (8K vocoder) or 13 kilobits per second (13K vocoder).

FIG. 17a shows a test signal generated by the signal generator 28 which includes a series of tone bursts 300 and 302 that follow a period of silence. The tone bursts 300 and 302 each carry a substantially similar amount of energy as indicated by an amplitude $E_0$.

FIG. 17b shows the tone bursts 300 and 302 received by the signal monitor 26 as a return signal after being routed through the base station 12 wherein the base station 12 contains a 13K vocoder. The tone bursts 300 and 302 in the return signal have a substantially similar energy level of $E_1$.

FIG. 17c shows the tone bursts 300 and 302 received by the signal monitor 26 as a return signal after being routed through the base station 12 wherein the base station 12 contains a 8K vocoder. The tone bursts 300 and 302 in the return signal have substantially differing energy level of $E_2$ and $E_3$, respectively.

The use of 8K versus 13K vocoders is determined by analyzing the difference in the energy levels of the bone bursts 300 and 302 in the return test signal. If the energy levels $E_2$ and $E_3$ differ by more than a threshold amount then it is concluded that the base station 12 is using an 8K vocoder because an 8K vocoder takes longer to respond to a large signal following a period of silence in comparison to a 13K vocoder.

FIGS. 18a–18b illustrate frame anomaly detection in the communication system 100. FIG. 18a shows a frame anomaly test signal generated by the signal generator 28. The frame anomaly test signal includes a series of frames 310–317 containing tone bursts having energy in the frequencies $F_1$ through $F_8$, respectively, followed by a period of silence 318 before a next series of frames.

FIG. 18b shows a return test signal that corresponds to the frame anomaly test signal. The signal monitor 26 analyzes the frequency content of each of the frames 310–317 in the return test signal to determine whether frame anomalies occurred during transmission. For example, frame 310 of the return test signal should contain energy in the frequency band $F_1$ (if no frame erasure occurred) or $F_2$ (if a frame erasure occurred). The signal monitor 26 analyzes the frame 310 for energy content at frequencies other than $F_1$ or $F_2$ to detect anomalies. In addition, the signal monitor 26 analyzes the period of silence 318 in the return test signal for any energy content. The period of silence 318 in the return test signal should not contain any energy content at any frequency unless an anomaly occurred during transmission.

Figure 19:
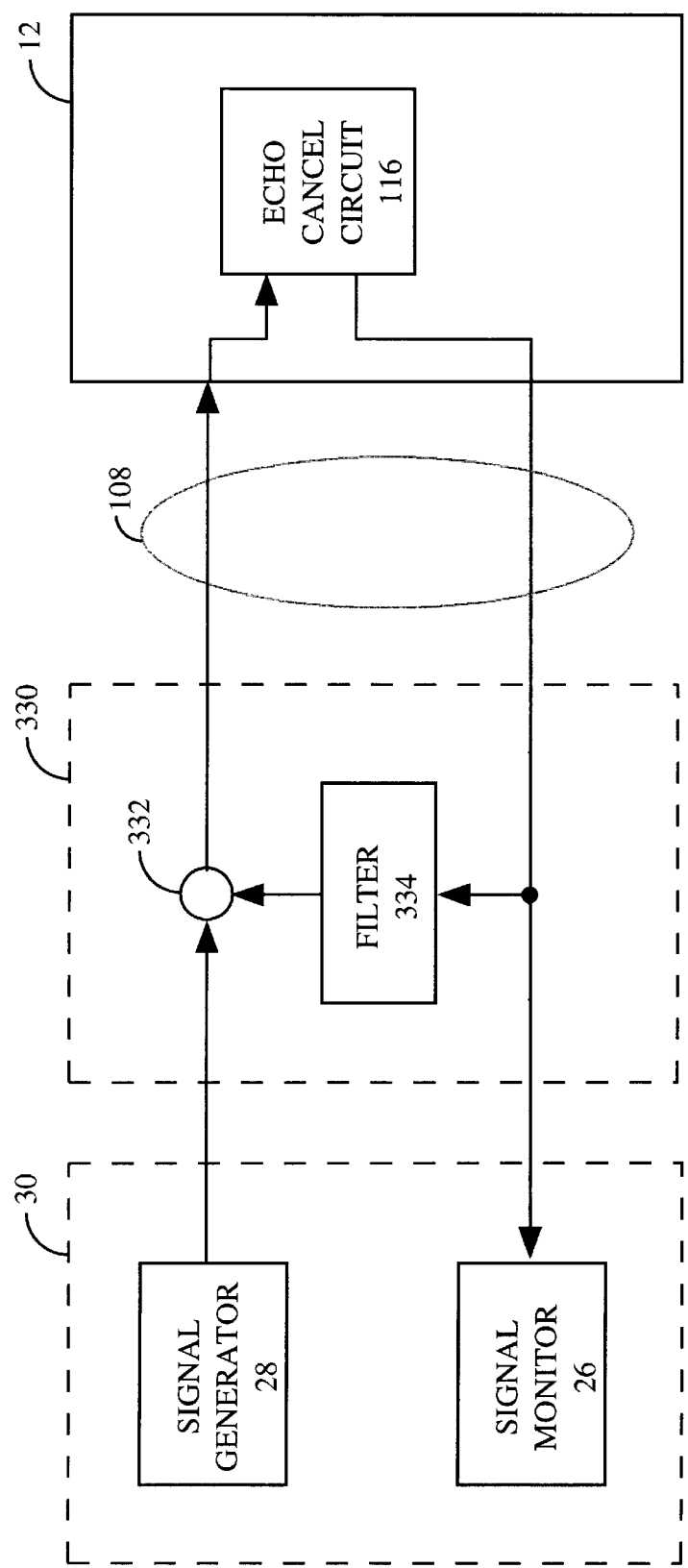
FIG. 19 illustrates a test of the echo cancel circuit contained in the base station using a hybrid simulator.

FIG. 19 illustrates a test of the echo cancel circuit 116 contained in the base station 12 using a hybrid simulator 330. The hybrid simulator 330 generates a simulated echo to exercise the echo cancel circuit 116. The hybrid simulator 330 includes a filter 334 and a summing circuit 332. The filter 334 provides a digital signal processing function for generating a simulated echo signal. The simulated echo from the filter 334 is added to a test signal from the signal generator 28 by the summing circuit 332.

While the impulse response function of the filter 334 is stable, the echo cancel circuit 116 converges onto the amount of simulated echo and cancels the echo. To test the amount of time taken by the echo cancel circuit 116 to converge and cancel the echo, the impulse response of the filter 334 is changed. The change in the filter 334 changes the amount of simulated echo which causes the echo cancel circuit to reset and reconverge on the new simulated echo.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for aligning a test signal to a series of frame intervals of a communication system, comprising the steps of:
   generating an alignment test signal having an alternating pattern of frequencies;
   transmitting the alignment test signal through the communication system wherein a communication link in the communication system carries the alignment test signal in a series of vocoder frame intervals;
   receiving the alignment test signal via the communication system as a return alignment test signal and then evaluating a frequency content of the return alignment test signal;
   shifting a starting time of the alignment test signal until the frequency content of the return alignment test signal corresponds to the alternating pattern of frequencies.

2. The method of claim 1, wherein the alternating pattern of frequencies comprise a first band of frequencies and a second band of frequencies such that the first and second band of frequencies do not overlap on a frequency scale and do not overlap on a time scale.

3. The method of claim 2, wherein a duration of the first frequency band and a duration of the second frequency band substantially equals a duration of a frame interval on the communication link.

4. The method of claim 3, wherein the step of shifting a starting time of the alignment test signal comprises the step of shifting the starting time of the alignment test signal if the return alignment test signal includes energy in both the first and second frequency bands that overlap on the time scale.

5. The method of claim 3, wherein each of a sequence of transitions between the first and second frequency bands on the time scale indicates a boundary of the frame intervals on the communication link if the frequency content of the return alignment test signal corresponds to the alternating pattern of frequencies.

6. The method of claim 5, further comprising the steps of:
   generating a test signal having a series of tone bursts wherein each tone burst has a duration less than a duration of each frame interval;
   aligning the tone bursts of the test signal to the frames of the communication link according to the boundaries indicated by the sequence of transitions.

7. The method of claim 1, wherein the step of transmitting the alignment test signal through the communication system comprises the steps of:
   transmitting the alignment test signal through the communication system to a destination location in a forward direction in the communication system from a source location;
   replicating the alignment test signal in the destination location;
   transmitting the alignment test signal through the communication system in a reverse direction to the source location as the return alignment test signal.

8. The method of claim 7, wherein the step of evaluating a frequency content of the return alignment test signal is performed in the source location.

9. The method of claim 1, wherein the step of transmitting the alignment test signal through the communication system comprises the steps of transmitting the alignment test signal through the communication system to a destination location in a forward direction from a source location such that the destination receives the alignment test signal as the return alignment test signal.

10. The method of claim 9, wherein the step of evaluating a frequency content of the received alignment test signal is performed in the destination location.

11. A test system for a communication system, comprising:
    means for generating an alignment test signal having an alternating pattern of frequencies;
    means for injecting the alignment test signal into the communication system wherein a communication link in the communication system carries the alignment test signal in a series of vocoder frame intervals;
    means for receiving the alignment test signal after transfer through the communication system as a return alignment test signal;
    means for evaluating a frequency content of the received alignment test signal;
    means for shifting a starting time of the alignment test signal until the frequency content of the return alignment test signal corresponds to the alternating pattern of frequencies.

12. The test system of claim 11, wherein the communication system includes a public switched telephone network and a base station that enables communication between the public switched telephone network and a subscriber terminal via the communication link.

13. The test system of claim 12, wherein the subscriber terminal includes means for receiving the alignment test signal from the base station and looping back the alignment test signal to the base station as the return alignment test signal.

14. The test system of claim 12, wherein the means for generating, the means for injecting, the means for evaluating, and the means for shifting are contained in a communication link tester coupled to the public switched telephone network.

15. The test system of claim 12, wherein the means for generating and the means for injecting are contained in a first tester coupled to the public switched telephone network and the means for evaluating and the means for shifting are contained in a second tester coupled to the subscriber terminal.

16. The test system of claim 15, wherein the first tester and the second tester each include a modem circuit that enable the transfer of control and status information between the first and second testers using frequency shift key (FSK) tone bursts that are aligned by the alignment test signal.

17. The test system of claim 12, wherein the means for generating and the means for injecting are contained in a first tester coupled to the subscriber terminal and the means for evaluating and the means for shifting are contained in a second tester coupled to the public switched telephone network.

18. The test system of claim 17, wherein the first tester and the second tester each include a modem circuit that enable the transfer of control and status information between the first and second testers using frequency shift key (FSK) tone bursts that are aligned by the alignment test signal.

19. The test system of claim 12, wherein the base station and the subscriber terminal each contain a vocoder having an output data rate.

20. The test system of claim 19, further comprising means for determining the output data rate by injecting a test signal into the communication system and analyzing a frequency content of a return test signal that corresponds to the test signal.

21. The test system of claim 11, further comprising:

means for generating a frame anomaly test signal having a series of tone bursts in differing frequency bands;

means for injecting the frame anomaly test signal into the communication system wherein the communication link carries the frame anomaly test signal in the sequence of frames;

means for receiving the frame anomaly test signal after transfer through the communication system as a return frame anomaly test signal;

means for evaluating a frequency content of the return frame anomaly test signal, wherein any energy contained in the return frame anomaly test signal other than in the series of tone bursts in differing frequency bands indicates a data corruption during transfer of one or more of the frames over the communication link.

* * * * *